United States Patent
Seino et al.

(10) Patent No.: US 9,057,789 B2
(45) Date of Patent: Jun. 16, 2015

(54) RADIATION MEASURING DEVICE

(75) Inventors: Tomoyuki Seino, Hitachi (JP); Yuichiro Ueno, Hitachi (JP); Takafumi Ishitsu, Hitachi (JP)

(73) Assignee: HITACHI, LTD., Tokyo (JP)

(*) Notice: Subject to any disclaimer, the term of this patent is extended or adjusted under 35 U.S.C. 154(b) by 296 days.

(21) Appl. No.: 13/818,000

(22) PCT Filed: Aug. 4, 2011

(86) PCT No.: PCT/JP2011/067831
§ 371 (c)(1),
(2), (4) Date: Feb. 20, 2013

(87) PCT Pub. No.: WO2012/029496
PCT Pub. Date: Mar. 8, 2012

(65) Prior Publication Data
US 2013/0146767 A1   Jun. 13, 2013

(30) Foreign Application Priority Data
Sep. 2, 2010 (JP) .................................. 2010-196323

(51) Int. Cl.
*G01T 1/17* (2006.01)
(52) U.S. Cl.
CPC .. *G01T 1/17* (2013.01); *G01T 1/171* (2013.01)
(58) Field of Classification Search
CPC ........................................................ G01T 1/17
USPC ..................................................... 250/336.1
See application file for complete search history.

(56) References Cited

U.S. PATENT DOCUMENTS 5,225,682 A   7/1993   Britton, Jr. et al.
(Continued)

FOREIGN PATENT DOCUMENTS

| JP | 09-211135 A | 8/1997 |
| JP | 2003-130957 A | 5/2003 |
| JP | 2004-529367 A | 9/2004 |

(Continued)

OTHER PUBLICATIONS

Japanese Office Action received in Japanese Application No. 2012-531765 dated Feb. 18, 2014.
Knoll, G.; "Radiation Detection and Measurement"; Third Edition; chapters 16 and 17, Wiley & Sons (2000).

*Primary Examiner* — David Porta
*Assistant Examiner* — Faye Boosalis
(74) *Attorney, Agent, or Firm* — Mattingly & Malur, PC (57) ABSTRACT

A radiation measuring device includes: a detector that detects radiation; a preamplifier that amplifies a signal outputted from the detector; a shaping amplifier that shapes the waveform of the signal outputted from the preamplifier; an A/D converter that converts the analog signal output from the shaping amplifier to a digital signal; and a digital data processing unit that calculates digital signal output from the A/D converter, wherein energy information of the radiation inputted to the detector is obtained from a pulse height of the pulse signal processed by the preamplifier and the shaping amplifier, and the pulse height of the current pulse is corrected in the digital data processing unit by performing an arithmetic operation using the pulse height information of the current pulse digitalized by the A/D converter, the generation time information of the preceding pulse, and the pulse height information of the preceding pulse.

8 Claims, 5 Drawing Sheets

(56) References Cited

U.S. PATENT DOCUMENTS

| | | | |
|---|---|---|---|
| 6,609,075 B1 * | 8/2003 | Warburton et al. | 702/87 |
| 2007/0147702 A1 | 6/2007 | Scoullar et al. | |
| 2009/0048795 A1 | 2/2009 | Scoullar et al. | |

FOREIGN PATENT DOCUMENTS

| | | |
|---|---|---|
| JP | 2005-121392 A | 5/2005 |
| JP | 2008-513740 A | 5/2008 |
| JP | 2009-229127 A | 10/2009 |

* cited by examiner

RADIATION MEASURING DEVICE

TECHNICAL FIELD

The present invention relates to a radiation measuring device.

BACKGROUND OF INVENTION

In the field of radiation measurement devices, one of the important indicators of the device performance is an ability to measure photon energies of gamma rays, X-rays or the like with high accuracy. As one photon of coming incident generates an amount of electric charge or light emission roughly in proportion to the photon energy, a semiconductor detector or a scintillation detector measures the photon energy by measuring the generated amount, respectively.

In the measurement, the semiconductor detector generates an electric charge, which is outputted as an electrical signal as it is. On the other hand, the scintillator generates light emission, which is converted to an electric signal by a photomultiplier tube or the like then outputted as a signal. In general, as the output signals from these detectors are weak, the detector output is input to and amplified by the preamplifier provided with integral capability. Measuring the pulse height or the peak value of the pulse signal from the preamplifier accurately means measuring the photon energy accurately.

It should be noted that an apparatus is called an analog radiation spectrometer that processes a pulse waveform through analog circuitry for determining the pulse height and then measure the photon energy.

When there are photons continually coming incident to the analog radiation spectrometer, pulse signals are continually generated. When a time interval between the pulse signals become shorter, a pulse waveform will be interfered by the preceding pulse waveform and the measurement accuracy of the pulse height will be deteriorated.

For example, if a coming pulse signal overlaps a decaying pulse signal of the preceding pulse, the pulse height of the coming pulse signal is less than the true value. A pole-zero cancellation circuit is used as an analog circuit to prevent this.

Also, if the analog radiation spectrometer is not appropriately adjusted, a baseline shift may occur when pulses are continually generated. A baseline restoration circuit is used to prevent this baseline shift.

Further, if the pulse intervals are extremely short, the coming pulse is superimposed on the preceding pulse that are not decaying yet and a pile-up phenomenon will occur. A pile-up rejection circuit is used to prevent this.

Patent Literature 1 discloses a pile-up correction circuit, as an analog circuit for detecting the pile-up and performing correction of the pulse height.

Patent Literature 2 discloses a pile-up rejection circuit.

In addition, Non-Patent Literature 1 describes techniques related to the pole-zero cancellation circuit (p.673), the baseline restoration circuit (p.677), and the pile-up rejection circuit (p.722).

On the other hand, there is a digital pulse-height analysis technique as a completely different approach. This is a technique to achieve the equivalent function as the waveform shaping with the arithmetic processing of digital values, by sampling and digitalizing the output of the preamplifier at constant intervals shorter than the transition time of waveforms. Even non-linear processing being easily realized with digital operation, many problems due to a short pulse interval can be resolved.

Non-Patent Literature 1 describes a digital pulse-height analysis technique (p.736) that always performs sampling in a shorter time than the time of waveform changes, that is, at a high speed.

In addition, Patent Literature 3 discloses a technique for arithmetic processing of sampled signals as described above.

PRIOR ART LITERATURE

Patent Literature

1. U.S. Pat. No. 5,225,682 A
2. Japanese Laid-Open Patent Application No. 2009-229127 A
3. Japanese Laid-Open Patent Application No. 2005-121392 A Non-Patent Literature 1. Radiation Detection and Measurement, Third Edition, by G. Knoll, translated by I. Kimura and E. Sakai, Nikkan Kogyo Shimbun Ltd.

SUMMARY OF INVENTION

Description of Related Art

However, there are problems such as an increase of noise by adding a circuit, an increase in the number of circuit, a need for adjustment, and an increase in cost, when using analog circuits such as the pole-zero cancellation circuit, the baseline restoration circuit, the pile-up rejection circuit and the pile-up correction circuit.

The impact will be large, especially if the number of detectors is enormous. For example, in case of an imaging device such as a gamma camera and a Single-Photon Emission Computed Tomography (SPECT) device used in a nuclear medicine diagnostic apparatus, the number of the detectors and signal processing circuits reaches more than several thousand. In such a case, it is difficult to perform circuit adjustments or adopt complex low-noise circuitry.

In addition, when a digital pulse-height analysis technology is employed, there is a problem that the number of data to be processed is greatly increased for a large number of detectors. Therefore the digital circuit size becomes huge and countermeasures become difficult for heat generated by the processing circuit due to high-speed and a large amount of arithmetic processing.

Accordingly, the present invention is intended to solve such problems, by providing a radiation measuring device with a simple circuit configuration, a low cost, less calculation amount and suitable for high count rate.

Means for solving Problems

In order to solve the problems described above and to achieve the objective of the present invention, a radiation measuring device will be configured as follows.

That is, the radiation measuring device includes: a detector that detects radiation; a preamplifier that amplifies signals outputted from the detector; a shaping amplifier that shapes the waveforms of the signals outputted from the preamplifier; an A/D converter that converts the analog signal output from the shaping amplifier to digital signals; and digital data processing units that calculate digital signal output from the A/D converter, wherein the energy information of the radiation inputted to the detector is obtained from the pulse height of the pulse signals processed by the preamplifier and the shaping amplifier, and the pulse height of the current pulse is corrected in the digital data processing units by performing arithmetic operations using pulse height information of the current pulse digitalized by the A/D converter, generation time information of the preceding pulse, and pulse height information of the preceding pulse.

Effects of Invention

According to the present invention, a radiation measuring device is provided with a simple circuit configuration, a low cost, less calculation amount and suitable for high count rate.

EMBODIMENT OF INVENTION

Embodiments of the present invention will be described hereinafter. A circuit configuration and an operation will be described in sequence for each embodiment.

First Embodiment

Circuit Configuration of Radiation Measuring Device

Figure 1:
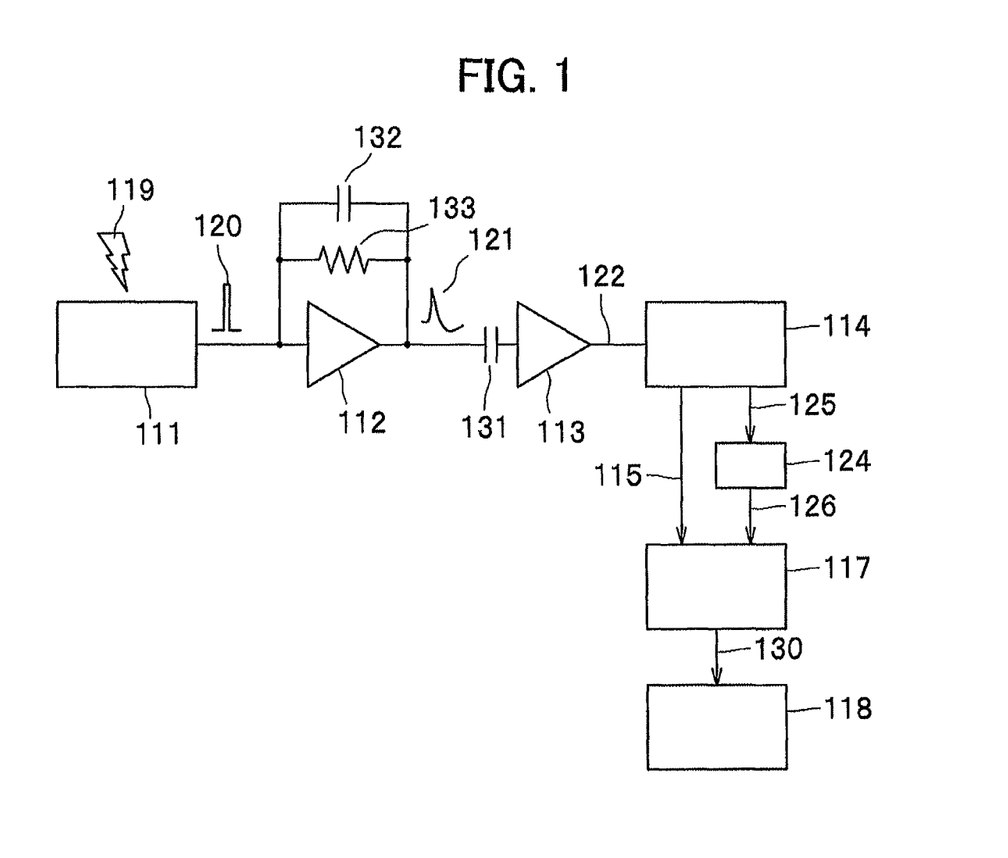
FIG. 1 is a block diagram showing a circuit configuration of a first embodiment of a radiation measuring device according to the present invention.

FIG. 1 is a block diagram showing a circuit configuration (device configuration) of the first embodiment of the present invention.

In FIG. 1, a detector 111 outputs a charge signal 120 that reflects the energy (energy of one photon), when a gamma ray 119 is input. An output terminal of the detector 111 is connected to the input terminal of a preamplifier 112.

In order to obtain the energy of the gamma ray 119 accurately, it is necessary to measure the pulse height or the peak value of the pulse signal from the preamplifier 112 accurately.

The preamplifier 112 is intended to amplify a weak signal from the detector 111 and to ensure the appropriate output impedance.

The charge signal 120 is inputted to the feedback preamplifier 112, integrated (operation by a capacitor 132) and amplified therein, and a pulse signal 121 is outputted therefrom.

It should be noted that a feedback resistance 133 and the feedback capacitor 132, each of which is connected in parallel with each other, between the input terminal and the output terminal of the preamplifier 112. Therefore, the preamplifier 112 is not saturated even though the pulse signal 121 is outputted for every input of the charge signal 120, and the pulse signal 121 attenuates according to the time constant determined by the feedback resistance 133 and the feedback capacitor 132. Specifically, this time constant is selected from about 50 to 500 microseconds.

The output terminal of the preamplifier 112 is connected to an input terminal of a shaping amplifier 113 via a capacitor 131 connected in series (series capacitor).

Thus, a DC component of the pulse signal 121 is removed by the capacitor 131, and only an AC component is inputted to the shaping amplifier 113.

It should be noted that the reason for removing the DC component by the capacitor 131 is to eliminate the deviation from the zero point in the shaping amplifier 113 and to amplify only the detected signal component.

The pulse signal 121 has noises derived from the detector 111 or the preamplifier 112 superimposed, and needs to go through the shaping amplifier 113 to remove these.

The shaping amplifier 113 is composed of a differentiating circuit (not shown) and an integrating circuit (not shown), and the time constant is usually selected to minimize noises while ensuring the integration time of the charge signal 120.

The shaping amplifier 113 is provided with a band pass filter function and an amplifying function. The high-frequency components and the low-frequency components, i.e. noises, are removed by the band-pass filter function and only detected signal components are amplified by the amplifying function.

An output terminal 122 of the shaping amplifier 113 is connected to the input terminal of an A/D converter (Analog-to-Digital Converter) 114.

The analog output signal (at 122) from the shaping amplifier 113 is inputted to the A/D converter 114, sampled and converted to a digital signal.

Upon detecting the peak of the analog output signal (at 122), the A/D converter 114 holds the peak voltage and digitalize it (a pulse height data 115). It also sends a trigger signal 125 to a timing data generator 124 at the same time as it detects the peak.

Figure 2:
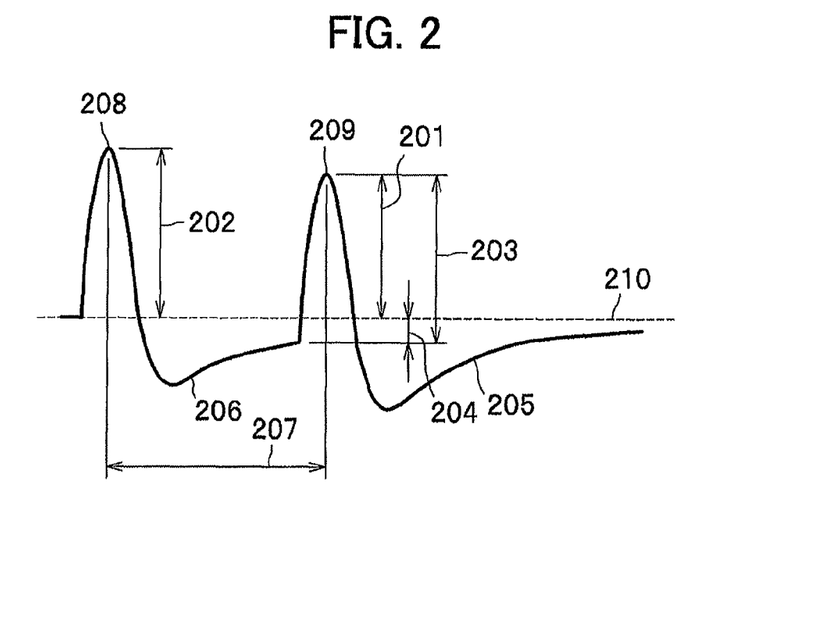
FIG. 2 is a signal waveform diagram for explaining the operation of the first embodiment of the present invention.

The timing data generator 124 transmits the elapsed time data 126 from the preceding pulses to an arithmetic unit 117 when a plurality of pulses are generated (see FIG. 2).

The pulse height data 115 from the A/D converter 114 and the elapsed time data 126 from the timing data generator 124 are sent to the arithmetic unit 117. After computing these data, the arithmetic unit 117 sends a corrected pulse height data 130 to a data acquisition unit 118.

The data acquisition unit 118 collects the corrected pulse height data 130, and outputs energy spectrum data.

It should be noted that the characteristic diagram of the energy spectrum is a graph to plot the relationship between the peak value and the pulse count, and when specific energy of gamma rays or X-rays come incident, that is represented by a peak in the energy spectrum. The finer the peak is, the higher the energy discrimination capability for radiation (energy resolution) is.

Operation of Radiation Measuring Device

The configuration of the first embodiment was described hereinabove, and next its operation will be described in a case when the charge signals 120 continually come incident.

FIG. 2 is a waveform diagram of the output signal from the shaping amplifier 113 in a case when the charge signals 120 (FIG. 1) continually come incident. It should be noted that it is a signal waveform diagram of the output from the shaping amplifier 113 and there are several differences in terms of gain or high-frequency components and low-frequency components, but substantially reflects the status of the output pulse signal 121 from the preamplifier 112.

When two charge signals 120 continually come incident, the output waveform from the shaping amplifier 113 after a first pulse 208 is like a waveform of an output signal 206, and the output waveform after a second pulse 209 is like a waveform of an output signal 205.

The first pulse 208 corresponds to a correct pulse height 202 with respect to a baseline 210 which is a reference potential point. It should be noted that the waveform of the first pulse 208 corresponds to a waveform of the pulse signal 121 (FIG. 1) obtained by integrating a charge signal 120 (FIG. 1) that is close to a square wave.

The first pulse 208 first decays in accordance with a time constant determined by the feedback resistance 133 and the feedback capacitor 132 as shown in the output signal 206, after crossing the baseline 210 and reversing the polarity, since there is the capacitor 131 (FIG. 1) in AC coupling between the preamplifier 112 (FIG. 1) and the shaping amplifier 113 (FIG. 1). In other words, it approaches to the baseline 210.

This behavior is natural because the waveform of the first pulse 208 mentioned above is in the positive side (positive direction above the baseline 210 of the reference potential point), and there is a necessity to flow the same amount as the integrated value of the waveform component at the positive side of the first pulse 208 in the negative side (negative direction below the baseline 210 of the reference potential point) after decay of the first pulse 208, since the series capacitor 131 does not flow a DC component. Therefore, the polarity is inverted to the negative side, as shown with the output signal 206.

It should be noted that the radiation measuring device operates so that the integrated value of the waveform on the positive side as shown with the first pulse 208 is more or less equal to the integrated value of the waveform on the negative side as shown with the output signal 206.

Here, when a second pulse 209 comes incident while the output signal 206 is decaying with the polarity inverted to the negative side, in other words, not fully returning back to the baseline 210, the pulse will overlap and a measured pulse height 201 ($V_{P201}$) is smaller than a correct pulse height 203 ($V_{P203}$) by a deviation 204 ($V_{204}$). Thus, it is impossible to know the pulse height of the second pulse 209 accurately by measuring the pulse height 201 ($V_{P201}$) only.

It should be noted that the second pulse 209 is generated after a time 207 ($t_{207}$) elapses after the first pulse 208 is generated.

Arithmetic Operation of Radiation Measuring Device

Therefore, it is necessary to perform arithmetic operations to obtain the correct pulse height 203 ($V_{P203}$) of the second pulse 209 and that will be described below.

In FIG. 2, the digital values of a pulse height 202 ($V_{P202}$), the pulse height 203 ($V_{P203}$) and the elapsed time 207 ($t_{207}$) are sent to the arithmetic unit 117 (FIG. 1), which in turn calculates the deviation 204 ($V_{204}$) using these values.

The deviation 204 ($V_{204}$) is caused by a measuring circuit and can be calculated by an arithmetic operation. That is, the pulse height 203 ($V_{P203}$) is corrected to the corrected pulse height data 130 ($V_{PS130}$) and then sent to the data acquisition unit 118. The arithmetic operation is as follow;

$$V_{PS130} = V_{P203} + k_1 \times [V_{P202} \times \cos(t_{207}/k_2) \times \exp(-t_{207} \times k_3)] \quad \text{(Equation 1)}$$

where $k_1$, $k_2$, $k_3$ are coefficients that depend on the measuring circuit.

Equation 1 corrects the pulse height 203 ($V_{P203}$) by performing arithmetic operations to obtain the deviation 204 ($V_{204}$). Equation 1 is a combination of algebraic calculations, a trigonometric function and an exponential function, and this is because the circuit response can be described by these functions, of which the most appropriate combination may be used.

The corrected pulse height data 130 ($V_{PS130}$) by Equation 1 should be a value close to the true pulse height 203 ($V_{P203}$), thereby reducing a measurement error of the energy amplitude of the gamma ray 119. As a result, the energy amplitude is measured with high accuracy for a case of high count rate such as when many gamma rays 119 continually come incident.

It should be noted that, in FIG. 2, it is assumed that the effect of the preceding pulses already disappeared at the preamplifier 112 and the output value of the shaping amplifier 113 is on the baseline 210 when the first pulse 208 comes incident. The effect of the preceding pulses is practically ignored if the interval between the preceding pulse and the first pulse 208 is sufficiently longer than the time constant (decay time constant) determined by the feedback resistance 133 and the feedback capacitor 132 in FIG. 1.

Second Embodiment

Next, a second embodiment will be described. In this embodiment, an example of a radiation measuring device will be shown that is capable to measure the energy value accurately even when the charge signal 120 comes incident more frequently than the case of the first embodiment.

Circuit Configuration of Radiation Measuring Device

The circuit configuration (device configuration) of the present embodiment is basically the same configuration as FIG. 1 for the first embodiment. However, the arithmetic unit 117 is required to have a computing unit capable of dealing with a case with a plurality of the charge signals 120 in succession.

Operation of Radiation Measuring Device

Figure 3:
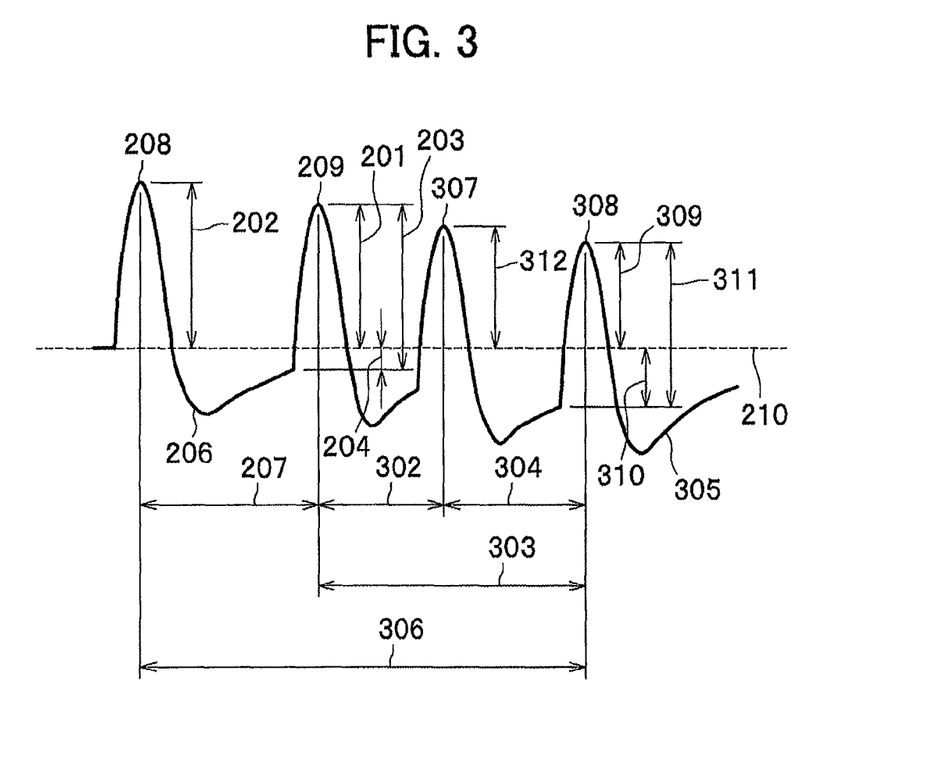
FIG. 3 is a signal waveform diagram for explaining the operation of the second embodiment of the present invention.

FIG. 3 is a signal waveform diagram showing an output waveform of the shaping amplifier 113 in a case of four charge signals 120 in succession to the radiation measuring device with the circuit configuration (device configuration) in FIG. 1. In FIG. 3, the parts in common with FIG. 2 are assigned the same reference numerals as FIG. 2.

That is, the first pulse 208, the second pulse 209, a third pulse 307, and a fourth pulse 308 are generated in chronological order. Here, each of the second pulse 209, the third pulse 307 and the fourth pulse 308 is generated continually before the preceding pulse signal completely decays.

In this case, a deviation 310 ($V_{310}$) of the fourth pulse 308 is greater than the deviation 204 ($V_{204}$) of the second pulse 209. The deviation becomes larger because the area in the negative polarity is increased for the zero-sum of the total area in accordance with an increase of the area in the positive polarity in FIG. 3 due to coming incident of many pulses, while the preamplifier 112 (FIG. 1) and the shaping amplifier 113 (FIG. 1) are configured with circuits not to pass DC components. In such cases it is insufficient to consider the last pulse only using Equation 1.

It should be noted that, in FIG. 3, a reference numeral 302 indicates a time ($t_{302}$) between the second pulse 209 and the third pulse 307, a reference numeral 303 is a time ($t_{303}$) between the second pulse 209 and the fourth pulse 308, a reference numeral 304 is a time ($t_{304}$) between the third pulse 307 and the fourth pulse 308, and a reference numeral 306 is a time ($t_{306}$) between the first pulse 208 and the fourth pulse 308.

Further, a reference numeral 305 is an output signal 305 of the output waveform after the fourth pulse 308.

A reference numeral 309 is a measured pulse height 309 ($V_{P309}$) of the fourth pulse 308, and a reference numeral 312 is a measured pulse height 312 ($V_{P312}$) of the third pulse 307.

In addition, a reference numeral 311 is a true pulse height 311 ($V_{P311}$) of the fourth pulse 308.

Arithmetic Operation of Radiation Measuring Device

In order to obtain the corrected pulse height data 130 ($V_{PS130}$) in the second embodiment, following equation is used.

$$V_{PS130} = \\ V_{P203} + k_1 \times [V_{P312} \times \cos(t_{304}/k_2) \times \exp(-t_{304} \times k_3)] + \\ k_1 \times [V_{P201} \times \cos(t_{303}/k_2) \times \exp(-t_{303} \times k_3)] + \\ k_1 \times [V_{P202} \times \cos(t_{306}/k_2) \times \exp(-t_{306} \times k_3)] \quad \text{(Equation 2)}$$

where $$t_{303} = t_{304} + t_{302}$$

$$t_{306} = t_{304} + t_{302} + t_{207}$$

That is, Equation 2 takes account of not only the effect of the last pulse as in Equation 1 but also the effect of three preceding pulses. It should be noted that these values are stored in the arithmetic unit 117 in FIG. 1 and the arithmetic operation is performed by retrieving them. The present embodiment (the second embodiment) enables to measure energy amplitude of the gamma ray 119 with high accuracy even in a case of higher count rates than the case of the first embodiment.

It should be noted, as described above, that the first embodiment to perform arithmetic operation based on Equation 1 in consideration of two pulses as shown in FIG. 2 cannot accurately measure a case of four pulses, as shown in FIG. 3.

However, the second embodiment to perform arithmetic operation based on Equation 2 in consideration of four pulses as shown in FIG. 3 can accurately measure a case with less than or equal to four pulses, including a case with two pulses as shown in FIG. 2, as well as a case with four pulses as shown in FIG. 3.

Third Embodiment

Next, a third embodiment will be described. In this embodiment, an example will be shown to implement the present invention corresponding to a case where the next pulse is generated in shorter time than the case of the first embodiment.

Circuit Configuration of Radiation Measuring Device

The circuit configuration (device configuration) of the present embodiment is basically same as FIG. 1 for the first embodiment. However, the arithmetic unit 117 is required to have a computing unit capable of dealing with a case when the next pulse is generated in shorter time than the case of the first embodiment.

Operation of Radiation Measuring Device

Figure 4:
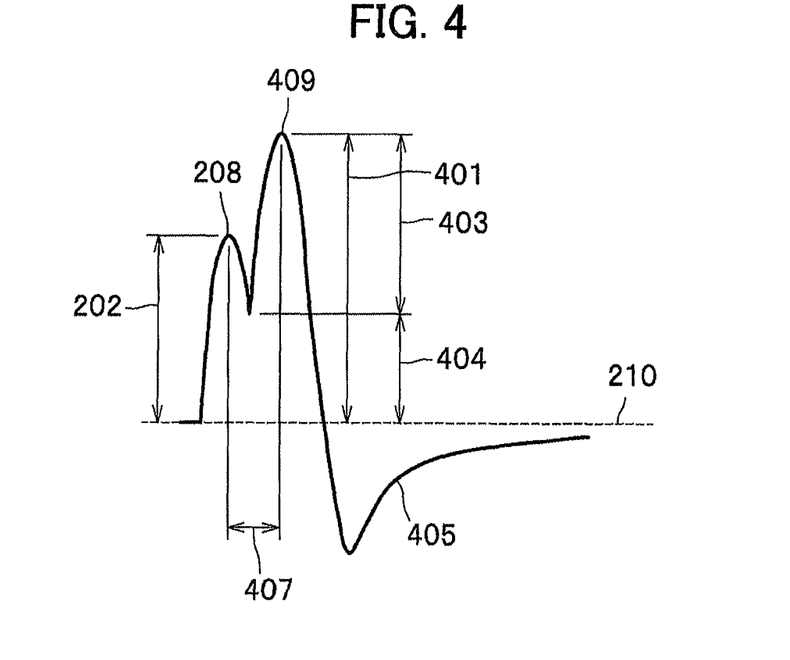
FIG. 4 is a signal waveform diagram for explaining the operation of the third embodiment of the present invention.

FIG. 4 is a diagram showing the output waveform of the shaping amplifier 113 in a case where a next charge signal 120 comes incident to the radiation measuring device with the device configuration in FIG. 1 immediately after the charge signal 120 reaches a peak. It should be noted that FIG. 4 shows a state in which a second pulse 409 is superimposed on the first pulse 208 before the pulse waveform thereof is inverted. In FIG. 4, the parts in common with FIG. 2 are assigned the same reference numerals as FIG. 2.

In the present embodiment, it is necessary to subtract a deviation 404 ($V_{404}$) from the corrected pulse height data 130 ($V_{PS130}$), since the deviation 404 ($V_{404}$) is positive. Such a case is conventionally called a pile-up, and its data was discarded without measuring the pulse height. The present invention uses an equation (Equation 3) shown below in order to obtain the corrected pulse height data 130.

It should be noted that a reference numeral 407 is a time 407 ($t_{407}$) between the first pulse 208 and the second pulse 409. In addition, a reference numeral 401 is a measured pulse height 401 ($V_{P401}$) of the second pulse 409. A reference numeral 403 denotes a difference voltage value ($V_{P403}$) between the last output value of the first pulse 208 and the measured pulse height 401 ($V_{P401}$) of the second pulse 409.

$$V_{PS130} = \\ V_{P403} + k_1 \times [V_{P202} \times \cos(t_{407}/k_2) \times \exp(-t_{407} \times k_3)] - \\ k_4 \times [V_{P202} \times \exp(-t_{407} \times k_5)] \quad \text{(Equation 3)}$$

That is, when the time interval from the preceding pulse is extremely short, Equation 3 is capable to obtain the corrected pulse height data 130 even if the deviation 404 ($V_{404}$) is in the same polarity as the pulse height by setting coefficients k4 and k5 appropriately.

A radiation measuring device according to the present embodiment does not require a pile-up rejection circuit or a pile-up correction circuit in the form of analog circuits.

Fourth Embodiment

Next, the fourth embodiment will be described. An explanation will be given on a case making use of a combination of a photomultiplier tube and a $CdWO_4$ scintillator detector which has an advantage of high sensitivity to high-energy gamma-rays because of high density and a long decay time component.

Circuit Configuration of Radiation Measuring Device

The circuit configuration (device configuration) of the present embodiment is basically the same configuration as FIG. 1 for the first embodiment. However, the detector 111 includes a combination of a $CdWO_4$ scintillator detector and a photomultiplier tube.

Operation of Radiation Measuring Device

A $CdWO_4$ scintillator is a substance that emits light whenever gamma rays or X-rays come incident, and the light emission amount is proportional to the energy of gamma ray per photon. This light emission is not generated and terminated instantaneously, rather a characteristic shows that the light reaches the maximum value in a finite time and then starts to decay. A time required for decaying at this time is referred to as the decay time. There are two or more decay times for some kinds of scintillator. The $CdWO_4$ scintillator is one of them such that the decay time for 40% of the light emission amount is 1.1 μs and the decay time for the remaining 60% is 14.5 μs.

When an output signal commensurate with the light emission having a long decay time component is processed by the radiation measuring device shown in FIG. 1, the decay continues for such a long time even for a single pulse processed by the shaping amplifier 113 and a next pulse is superimposed during decay of the current pulse, if the next pulse comes in a short time interval.

Thus, assuming that the light emission decay time of the $CdWO_4$ scintillator provided in the detector 111 in the configuration of FIG. 1 is constant, the pulse height of the next pulse is corrected by predicting the impact to the next pulse through calculation. Thereby, it is possible to suppress the deterioration of the energy resolution at high count rates. Therefore, the $CdWO_4$ scintillator may be used for a radiation measuring device having an advantage of high sensitivity to high-energy gamma-rays because of high density.

As a result of using a $CdWO_4$ scintillator as the detector 111 for the radiation measuring device shown in FIG. 1 and modifying coefficients $k_1$, $k_2$, $k_3$ at Equation 1, the energy resolution for the 662 keV gamma-ray of $^{137}Cs$ is 8% at the count rate of 100 times per second and 9% at the count rate of 1000 times per second. It shows good results when compared with a case where the energy resolution is 8% with no change at the count rate of 100 times per second but deteriorated to 15% at the count rate of 1000 times per second, using a radiation measuring device shown in FIG. 6 for a first example of comparable circuits to be described later. That is, deterioration of the energy resolution at high count rates can be suppressed according to the present invention, even when using a scintillator detector having a long decay time component. It should be noted that the meaning of the energy resolution will be described later.

Other Embodiments

In the second embodiment, Equation 2 takes account of the effect of the three preceding pulses, but it can be extended to consider the effect of any number of preceding pulses.

The number of preceding pulses to be considered, that is, the number of times to store and calculate may be determined largely by the number of pulses to be generated within a time decaying to the baseline 210 (see FIG. 2). That number would be the average number of pulses generated between 50 μs, for example, if the decay time constant of the preamplifier 112 (see FIG. 1) is 50 μs.

In the third embodiment, Equation 3 can be expanded to take account of the effect of any number of preceding pulses. In this case, the equation extended to consider the effect of N pulses (N is a positive integer) is commonly adaptable to those cases with the number of pulses less than or equal to N.

In FIG. 1, each of the timing data generator 124, the arithmetic unit 117, and the data acquisition unit 118 is represented by a block for each of functions, but they may be integrated. They may be integrated as a digital data processing unit, for example. Further, functions other than those mentioned above may also be provided in the digital data processing unit.

In addition, an example was shown with an algebraic calculation, a trigonometric function and an exponential function as arithmetic functions provided in the arithmetic unit 117, but other functions may be provided also.

In operation of trigonometric and exponential functions, the circuit may be configured either to calculate any input value or to draw from the preset values in a table.

Also, the trigonometric and exponential functions that operate in the real region may be operated at once in the complex region (exponential function extended to the complex region).

In addition, the circuit of the arithmetic unit 117 may be constituted by hardware, software or a combination of them.

Comparable Circuit

Next, comparable circuits different from the present embodiments will be shown, in order to clarify the features of the present embodiments. By comparison, the differences in characteristics and effects will be described.

Comparable Circuit 1

Figure 5:
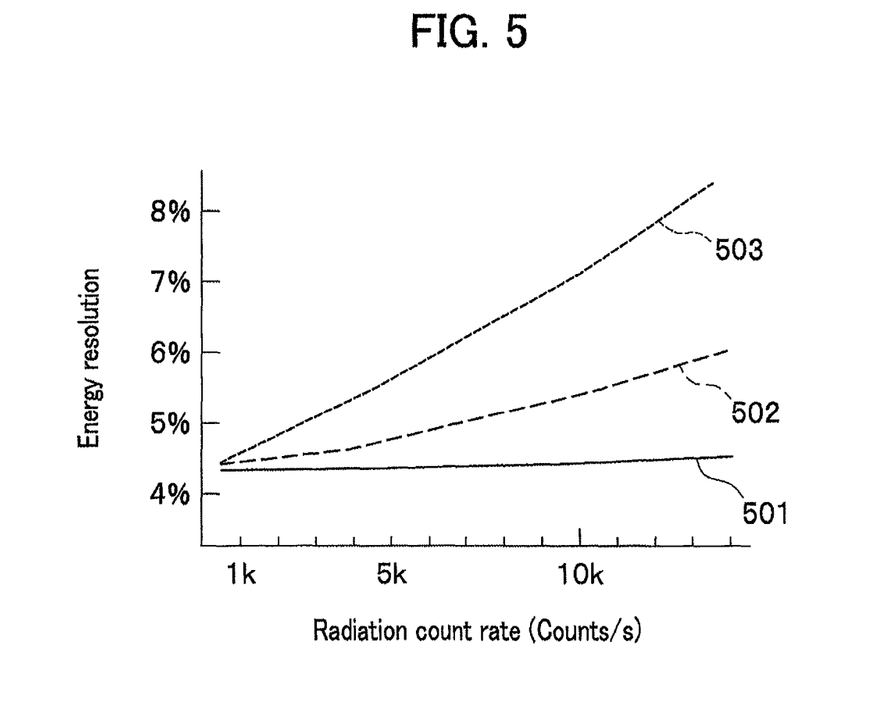
FIG. 5 is a characteristic chart comparing the characteristics of an embodiment of the present invention and the characteristics of comparable circuits.
Figure 6:
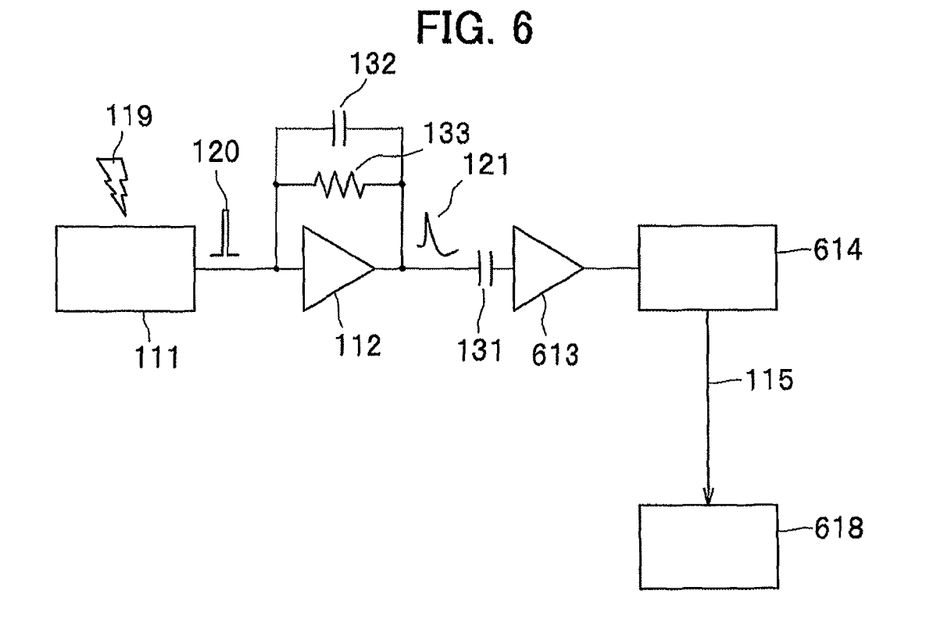
FIG. 6 is a block diagram showing a circuit configuration of an analog radiation spectrometer as a radiation measuring device in a comparable circuit 1.

FIG. 6 shows a comparable circuit 1 against the radiation measuring device (FIG. 5 will be described later).

FIG. 6 is a circuit block diagram showing a circuit configuration of an analog radiation spectrometer as a comparison circuit 1. In FIG. 6, a shaping amplifier 613 is equipped with all of a pole-zero cancellation circuit (not shown), a baseline restoration circuit (not shown), and a pile-up rejection circuit (not shown). In addition, the pulse height of signals outputted from the shaping amplifier 613 are digitalized by an A/D converter 614, then sent to a data acquisition unit 618 directly without being processed for an arithmetic operation.

Comparison of Characteristics with Comparable Circuit 1

FIG. 5 shows a result of comparing the radiation measuring devices of the present embodiments (first to third) with a radiation measuring device in the comparable circuit 1 (FIG. 6).

In FIG. 5, the horizontal axis is the radiation count rate (Counts/s), the vertical axis is the energy resolution (percentage %). It should be noted that the energy resolution is the value with a half width of the peak divided by the horizontal position of the peak in the measured energy spectrum, and the smaller the value is, the better and higher performance the energy discrimination capability is.

In FIG. 5, a third characteristic line 503 shows a characteristic when none of a pole-zero cancellation circuit (not shown), a baseline restoration circuit (not shown) or a pile-up rejection circuit (not shown), all of which are mounted in a shaping amplifier 613, is activated in the analog radiation spectrometer in the comparable circuit 1 shown in FIG. 6. It should be noted that CdTe is used in the detector 111 and a 122 keV gamma-ray of $^{57}Co$ comes incident as a gamma ray 119.

On the third characteristic line 503, the energy resolution is 8% at the count rate of 100 times per second but deteriorated to 15% at the count rate of 1000 times per second. It is understood that the energy resolution becomes better rapidly in accordance with the increase of the count rate (high count rate) on the third characteristic line 503. An increase of the energy resolution value means a decrease of the energy discrimination capability and it is undesirable.

In addition, a second characteristic line 502 shows a characteristic when all of the pole-zero cancellation circuit (not shown), the baseline restoration circuit (not shown) and the pile-up rejection circuit (not shown), all of which are mounted in the shaping amplifier 613, are activated. Comparing the second characteristic line 502 with the third characteristic line 503, it is understood that the deterioration of the energy resolution is suppressed with respect to the count rate. However, comparing the second characteristic line 502 with a first characteristic line 501, it shows that the analog circuit measures in the comparable circuit 1 cannot render correction completely with respect to the increase of the count rate.

Characteristics using the radiation measuring devices according to the present embodiments (first to third) is shown with the first characteristic line 501, which shows that there is not a significant change in the energy resolution seen with respect to the count rate. That is, the result shows that the radiation measuring devices according to the present embodiments (first to third) can correct the dependency on the count rate for the energy resolution almost completely.

Comparable Circuit 2

Figure 7:
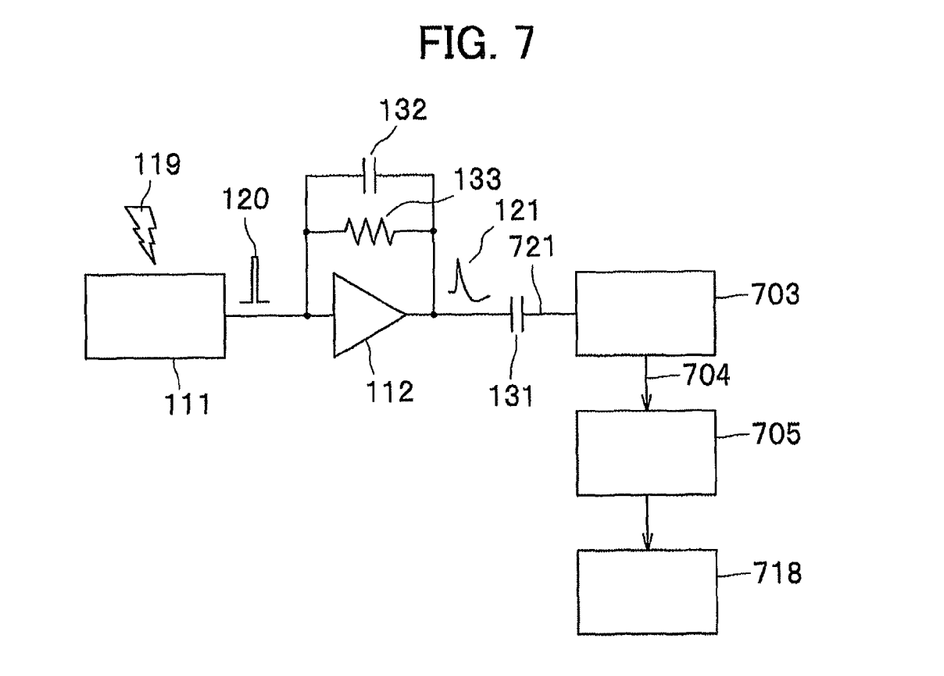
FIG. 7 is a block diagram showing a circuit configuration of a digital pulse-height analyzer as a radiation measuring device in a comparable circuit 2.

A digital pulse-height analyzer is shown in FIG. 7 as a comparable circuit 2.

FIG. 7 is a circuit block diagram showing a circuit configuration of a digital pulse-height analyzer as the comparable circuit 2. In FIG. 7, upon the gamma ray 119 coming incident to the detector 111, the charge signal 120 is generated, then that is integrated and amplified by the preamplifier 112. The description so far is similar to FIG. 1 of the present embodiment, but in the digital pulse-height analyzer, the output pulse signal 121 from the preamplifier 112 is directly inputted to a high speed A/D converter 703 via the series capacitor 131 (not through the shaping amplifier 613 in FIG. 6). The output pulse signal 121 is all digitalized at a very fine sampling interval and outputted as a waveform data 704, which is arithmetically processed in a high-speed arithmetic unit 705 then sent to a data acquisition unit 718.

Characteristic Comparison with Comparable Circuit 2

The same result as the first characteristic line 501 in FIG. 5 was given by the digital pulse-height analyzer in FIG. 7, similarly with the present embodiments (first to third). However, there is a significant difference in the number of computations.

Figure 8:
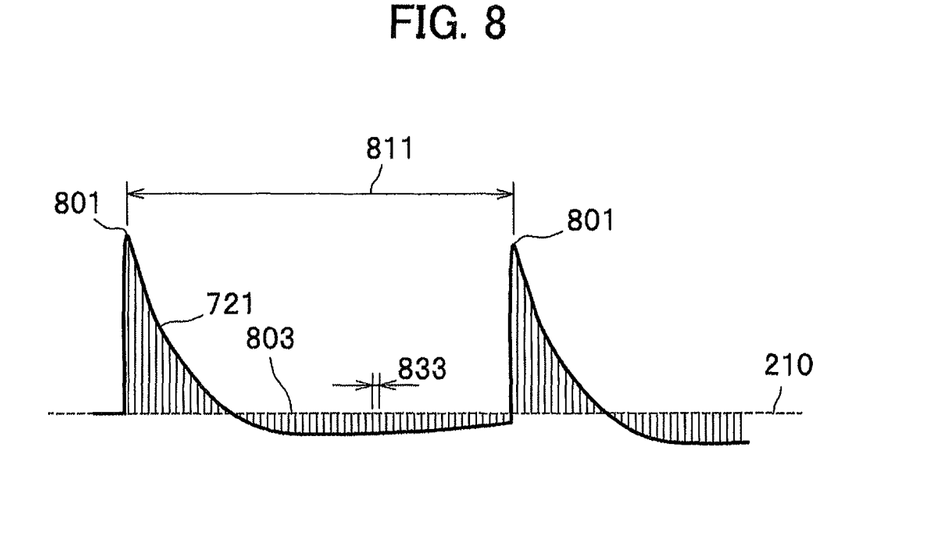
FIG. 8 is a signal waveform diagram for explaining the operation of a digital pulse-height analyzer as a radiation measuring device in the comparable circuit 2.

FIG. 8 is a signal waveform diagram (example for comparison) showing an input waveform 721 to the high-speed A/D converter 703 (FIG. 7) and a sampling waveform 803 in a case that the charge signal 120 continually come incident. It should be noted that output signal from the preamplifier 112 is represented with the waveform 121 (FIG. 7).

In FIG. 8, if a sampling interval 833 of the digital pulse-height analyzer (that is, the comparable circuit 2) is 20 ns and a pulse 801 changes with 50 μs of a pulse interval 811, the number of samplings per pulse reaches 2500.

On the other hand, the number of samplings per pulse is just one in the present embodiments (first to third) or the number of data is two even considering the need for time data, thereby the number of data to be processed is significantly fewer in the present embodiments (first to third). The number of data is eight per pulse even including pulse height values and time data for three preceding pulses, thereby requiring several orders of magnitude fewer data again. As a result, it is possible to achieve a system using multi-channel detectors at a low cost, as the amount of data processing and computations is much less even with large number of detectors.

Supplement to Present Embodiment and Invention

As described hereinabove, the present embodiments require none of countermeasures by analog circuits such as a pole-zero cancellation circuit, a baseline restoration circuit, a pile-up rejection circuit and a pile-up correction circuit. Therefore, the circuit configuration as analog circuits is simplified. This means that the circuit can be simplified even with a large number of detectors, thereby contributing greatly to produce a low-cost device.

In addition, the number of computations can be significantly reduced, compared with a digital pulse-height analyzer. That is, the digital pulse-height analyzer constantly needs to perform waveform sampling at intervals short enough with respect to the waveform change, and computations. On the other hand, the present embodiment requires a pulse height sampling only at the coming incident of a pulse. This is same as a pulse height sampling after waveform-shaping of pulse signals in a conventional analog radiation spectrometer, requiring significantly fewer amount of information than constantly sampling waveforms as a digital waveform analyzer.

However, as it is necessary to use pulse height information and time information of the preceding pulses for the arithmetic operations in the present invention, the number of data is larger than an analog radiation spectrometer in a comparative example. Yet, the number of data for the present invention is much fewer than that for a digital waveform analyzer. Accordingly, the number of arithmetic operations is also fewer and it does not become large even for a case using many detectors.

Further, the pulse height can be measured with high accuracy according to the present invention, even when the output from the detector has a unique long decay. This is because a shift from the baseline due to a long decay can be corrected with digital operations, by considering the decay of the preceding pulses in the arithmetic operations. Therefore, it is possible to use detectors each of which has a long decay time and was conventionally unable to use with short pulse intervals, in other words, at high count rates.

LEGEND FOR REFERENCE NUMERALS

111 Detector
112 Preamplifier
113, 613 Shaping amplifier
114, 614 A/D converter
115 Pulse height data
117 Arithmetic unit (Digital data processing unit)
118, 618, 718 Data acquisition unit (Digital data processing unit)
119 Gamma ray
120 Charge signal
121 Output signal of Preamplifier, Output pulse signal, Output waveform 122 Output signal, Output signal of Shaping amplifier
124 Timing data generator (Digital data processing unit)
125 Trigger signal
126 Elapsed time data
130 Corrected pulse height data
131 Capacitor, Series capacitor
132 Capacitor, Feedback capacitor
133 Feedback resistance
201, 309, 312, 401 Measured pulse height
202 Measured and true pulse height
203, 311, 403 True pulse height
204, 310, 404 Deviation
205, 206, 405 Output waveform of Shaping amplifier
207, 302, 303, 304, 306, 407 Time
208 First pulse
209, 409 Second pulse
210 Baseline
307 Third pulse
308 Fourth pulse
501 First characteristic line
502 Second characteristic line
503 Third characteristic line
703 High-speed A/D converter
704 Waveform data
705 High-speed arithmetic unit
721 Input waveform of high-speed A/D converter
801 Pulse
803 Sampling pulse, Sampling waveform
811 Pulse interval
833 Sampling interval

What is claimed is:

1. A radiation measuring device comprising:
   a detector that detects radiation;
   a preamplifier that amplifies a signal outputted from the detector;
   a shaping amplifier that shapes a waveform of the signal outputted from the preamplifier;
   an A/D converter that converts an analog signal output from the shaping amplifier to a digital signal; and
   a digital data processing unit that calculates digital signal from the A/D converter,
   wherein the energy information of the radiation inputted to the detector is obtained from a pulse height of the pulse signal processed by the preamplifier and the shaping amplifier, and
   the pulse height of the current pulse is corrected in the digital data processing unit by performing an arithmetic operation using pulse height information of the current pulse digitalized by the A/D converter, generation time information of the preceding pulse, and pulse height information of the preceding pulse.

2. The radiation measuring device according to claim 1, wherein the arithmetic operation in the digital data processing units to correct the pulse height of the current pulse using digitalized pulse height information of the current pulse, the generation time information of the preceding pulse, and the pulse height information of the preceding pulse comprise at least one of an algebraic calculation, a trigonometric function and an exponential function or a combination of a plurality thereof.

3. The radiation measuring device according to claim 2, wherein the arithmetic operation in the digital data processing unit to correct the pulse height of the current pulse using pulse height information of the current pulse, generation time information of the preceding pulse, and pulse height information of the preceding pulse are performed using a generation time and a pulse height of each of a plurality of the preceding pulses digitalized and stored beforehand.

4. The radiation measuring device according to claim 3, wherein the arithmetic operation in the digital data processing unit to correct the pulse height of the current pulse using pulse height information of the current pulse, the generation time information of the preceding pulse, and the pulse height information of the preceding pulse is performed even for a case in which the current pulse is generated before the pulse waveform of the preceding pulse is inverted.

5. The radiation measuring device according to claim 2, wherein the arithmetic operation in the digital data processing unit to correct the pulse height of the current pulse using pulse height information of the current pulse, the generation time information of the preceding pulse, and the pulse height information of the preceding pulse is performed even for a case in which the current pulse is generated before the pulse waveform of the preceding pulse is inverted.

6. The radiation measuring device according to claim 1, wherein the arithmetic operation in the digital data processing unit to correct the pulse height of the current pulse using pulse height information of the current pulse, the generation time information of the preceding pulse, and the pulse height information of the preceding pulse is performed using a generation time and a pulse height of each of a plurality of the preceding pulses digitalized and stored beforehand.

7. The radiation measuring device according to claim 6, wherein the arithmetic operation in the digital data processing unit to correct the pulse height of the current pulse using pulse height information of the current pulse, the generation time information of the preceding pulse, and the pulse height information of the preceding pulse is performed even for a case in which the current pulse is generated before the pulse waveform of the preceding pulse is inverted.

8. The radiation measuring device according to claim 1, wherein the arithmetic operation in the digital data processing unit to correct the pulse height of the current pulse using pulse height information of the current pulse, the generation time information of the preceding pulse, and the pulse height information of the preceding pulse is performed even for a case in which the current pulse is generated before the pulse waveform of the preceding pulse is inverted.

* * * * *